(12) United States Patent
Venugopalan et al.

(10) Patent No.: US 10,748,169 B2
(45) Date of Patent: Aug. 18, 2020

(54) METHODS AND SYSTEMS FOR REWARDING CUSTOMERS IN A TOKENIZED PAYMENT TRANSACTION

(71) Applicant: MASTERCARD ASIA PACIFIC PTE. LTD., Singapore (SG)

(72) Inventors: Vijin Venugopalan, Singapore (SG); Joseph Damon Hayes, Singapore (SG)

(73) Assignee: MASTERCARD ASIA PACIFIC PTE. LTD., Singapore (SG)

( * ) Notice: Subject to any disclaimer, the term of this patent is extended or adjusted under 35 U.S.C. 154(b) by 511 days.

(21) Appl. No.: 15/150,892

(22) Filed: May 10, 2016

(65) Prior Publication Data
US 2016/0335656 A1 Nov. 17, 2016

(30) Foreign Application Priority Data

May 11, 2015 (SG) .............................. 10201503701P

(51) Int. Cl.
*G06Q 30/00* (2012.01)
*G06Q 30/02* (2012.01)
(Continued)

(52) U.S. Cl.
CPC ....... *G06Q 30/0226* (2013.01); *G06Q 20/367* (2013.01); *G06Q 20/385* (2013.01);
(Continued)

(58) Field of Classification Search
CPC ............. G06Q 30/0226; G06Q 20/367; G06Q 20/3672; G06Q 30/0215; G06Q 20/385; G06Q 20/387; G06Q 20/3821
(Continued)

(56) References Cited

U.S. PATENT DOCUMENTS 10,380,585 B2 *  8/2019  Harris ................... G06Q 20/12
2002/0133467 A1 *  9/2002  Hobson ................. G06Q 20/04
                                                                705/64
(Continued)

FOREIGN PATENT DOCUMENTS

JP           11-39401 A     2/1999
JP        2002-0298055 A   10/2002
(Continued)

OTHER PUBLICATIONS

Nagasubramanian, et al., Online Payment-Innovation in Split Tender Payment. International Journal of Computer Applications, vol. 55, No. 10, Oct. 2012. (Year: 2012).*

*Primary Examiner* — Luis A Brown
(74) *Attorney, Agent, or Firm* — Harness, Dickey & Pierce, P.L.C.

(57) ABSTRACT

Methods and systems for processing an electronic transaction between a cardholder and a merchant using a payment card carried out over a payment network are provided. An example method comprises receiving tokenization data including identification data associated with a token representing payment data of the payment card, and issuer data indicative of rewards information associated with the payment card; receiving a rewards inquiry request from a merchant terminal, where the rewards inquiry request comprises the token and where the token is associated with the payment data for making the transaction; determining the rewards information associated with the rewards inquiry request using the tokenization data; and transmitting the rewards information to the merchant terminal for preparation of a transaction request to an acquirer using the rewards information.

13 Claims, 4 Drawing Sheets

(51) Int. Cl.
*G06Q 20/36* (2012.01)
*G06Q 20/38* (2012.01)

(52) U.S. Cl.
CPC ....... *G06Q 20/387* (2013.01); *G06Q 20/3821* (2013.01); *G06Q 30/0215* (2013.01)

(58) Field of Classification Search
USPC ............................................. 705/14.17, 14.27
See application file for complete search history.

(56) References Cited

U.S. PATENT DOCUMENTS

| | | | | |
|---|---|---|---|---|
| 2004/0122736 | A1* | 6/2004 | Strock | G06Q 30/0231 705/14.31 |
| 2006/0053056 | A1* | 3/2006 | Alspach-Goss | G06Q 20/10 705/14.17 |
| 2011/0010238 | A1* | 1/2011 | Postrel | G06Q 30/0229 705/14.38 |
| 2011/0060629 | A1* | 3/2011 | Yoder | G06Q 20/10 705/14.1 |
| 2011/0208656 | A1* | 8/2011 | Alba | G06Q 20/36 705/65 |
| 2013/0132184 | A1* | 5/2013 | Mutha | G06Q 30/06 705/14.27 |
| 2015/0032625 | A1* | 1/2015 | Dill | G06Q 20/40 705/44 |
| 2015/0127547 | A1* | 5/2015 | Powell | G06Q 20/385 705/67 |
| 2015/0161642 | A1* | 6/2015 | Pastore | G06Q 30/0224 705/14.25 |
| 2015/0186871 | A1* | 7/2015 | Laracey | G06Q 20/3278 705/41 |
| 2015/0254638 | A1* | 9/2015 | Bondesen | G06Q 20/3674 705/41 |
| 2015/0332264 | A1* | 11/2015 | Bondesen | G06Q 20/385 705/44 |
| 2016/0019533 | A1* | 1/2016 | Wu | G06Q 20/3278 705/67 |
| 2016/0071094 | A1* | 3/2016 | Krishnaiah | G06Q 20/3672 705/66 |
| 2016/0203475 | A1* | 7/2016 | Venugopalan | G06Q 20/3672 705/66 |
| 2016/0239833 | A1* | 8/2016 | Venugopalan | G06Q 20/20 |
| 2016/0283942 | A1* | 9/2016 | Chitragar | G06Q 20/327 |
| 2016/0358163 | A1* | 12/2016 | Kumar | G06Q 20/02 |
| 2017/0195879 | A1* | 7/2017 | Jones-McFadden | G06Q 20/227 |
| 2017/0270557 | A1* | 9/2017 | Maenpaa | G06Q 20/327 |

FOREIGN PATENT DOCUMENTS

| | | |
|---|---|---|
| JP | 2006-23843 A | 1/2006 |
| WO | WO2015/054697 | 4/2015 |

* cited by examiner

US 10,748,169 B2

METHODS AND SYSTEMS FOR REWARDING CUSTOMERS IN A TOKENIZED PAYMENT TRANSACTION

CROSS-REFERENCE TO RELATED APPLICATION

This application claims the benefit of, and priority to, Singapore Patent Application No. 10201503701P filed May 11, 2015. The entire disclosure of the above application is incorporated herein by reference.

FIELD

Methods and systems for processing an electronic transaction are proposed. In particular, a method and system is proposed, generally, for enabling instant retrieval of rewards information during an electronic transaction carried out over a payment network.

BACKGROUND

This section provides background information related to the present disclosure which is not necessarily prior art.

Payment card (such as credit cards, debit cards, charge cards, pre-paid cards, etc.) issuers use rewards programs and schemes (such as cash-back rewards, discounts at retail outlets, accumulative reward points/mileage, etc.) to improve the profitability of the cards. In particular, different card issuers use different reward programs to attract new customers signing up for their cards, and to incentivize existing cardholders to increase the usage of the card in terms of transaction amount and value.

The payment cards are issued by financial institutions such as banks (also known as issuers or issuing banks) and are associated with one or more bank accounts (e.g. a credit card account, a loan account, a checking account, a savings account etc.) of the cardholder at the issuing bank. Typically, each payment card is associated with an account number (known as the primary account number, PAN—typically a 16-digit number) which can be used for performing point-of-sale (POS) transactions as well as Internet-based/e-commerce transactions (e.g. making a payment) with a merchant. Conventionally, the first six digits of the PAN (e.g. 5466 1601 XXXX XXXX) of a credit/debit card are the Bank Identification Number (BIN) (also known as the Issuer Identification Number (IIN))—in this case 554616. In other words, the BIN range allows cards issued by different banks to be differentiated from one and another. In the current rewards system, when a cardholder makes a transaction using the card, the merchant and the card issuer offers rewards based on the BIN range of the card used in that transaction.

However, in processing an electronic transaction, secure handling of sensitive card data is usually required to minimize their exposure to security risks such as fraud. Sensitive card data is usually tokenized (a process in which sensitive data is replaced by non-sensitive data which is infeasible to reverse in the absence of a detokenization system) before it is handled by the relevant parties. In the process, a token is generated by a card scheme server, which has a format which resembles the real card credentials (e.g. a 16-digit number PAN) which is used during payment processing. Tokenization also applies to a scenario in which the physical plastic payment cards is not present on a transaction, rather, the tokenized payment credentials embodied in other physical devices, such as appropriately configured smart phones, are used for a payment. In such a case, a cardholder presents his smart phone as the payment device for an electronic transaction, e.g. a POS transaction at a retail outlet.

With tokenization, however, the BIN ranges, which are assigned by the card scheme server, no longer allow two card issuers to be differentiated based on the first 6-digits of the token (i.e. the tokenized PAN). Instead, card issuers are differentiable based on the first 8-digits (e.g. 5466 1601 23XX XXXX). Therefore, the current rewards system would no longer work for electronic transactions which are tokenized.

Therefore, it is desirable to provide an improved system and method for retrieving rewards for cards used in a tokenized electronic transaction.

SUMMARY

This section provides a general summary of the disclosure, and is not a comprehensive disclosure of its full scope or all of its features. Aspects and embodiments of the disclosure are also set out in the accompanying claims.

The present disclosure aims to provide systems and methods of processing an electronic payment using a payment card carried out over a payment work such that rewards information associated with the issuer can be instantly retrieved and/or applied at the point of transaction, when tokenized payment data is used in the transaction.

According to a first aspect, there is provided a method for processing an electronic transaction between a cardholder and a merchant using a payment card carried out over a payment network. The method comprises receiving, by a rewards management system, tokenization data, said tokenization data comprising identification data associated with a token representing payment data of the payment card, and issuer data indicative of rewards information associated with the payment card; the rewards management system receiving a rewards inquiry request from a merchant terminal, said rewards inquiry request comprising the token, the token being associated with the payment data for making the transaction; and the rewards management system transmitting the rewards information to the merchant terminal for preparation of a transaction request to an acquirer using the rewards information.

Advantageously, compared to existing processes, the present method allows the rewards information associated with the token presented by a customer to be determined instantly using the tokenization data.

In one embodiment, the rewards management system receives the tokenization data from a server of the card issuer.

Typically, the token has been generated, upon a request from the issuer, by a tokenization server storing a mapping between payment credentials of the payment card.

In one embodiment, the method comprises determining the rewards information using a rewards database storing rewards information corresponding to respective issuer data.

In one embodiment, the issuer data comprises an identity of the issuer of the payment card. The issuer data may further comprise a sub-category of the payment card issued by the issuer; each sub-category of payment cards being associated with respective rewards information.

The rewards inquiry request may further comprise at least one of: (a) a transaction value, (b) a transaction time and (c) a merchant terminal identifier.

Alternatively, the disclosure may be expressed as a rewards management system for processing an electronic transaction between a cardholder and a merchant using a payment card carried out over a payment network. The system comprises a server configured to be in communication with a merchant terminal. The server has a computer processor and a data storage device, and the data storage device stores non-transitory instructions operative by the processor to cause the processor to perform the operations of the method as described above. The system is designed to handle the identification data within the tokenization data, which will typically be different from the identification data processed by a conventional rewards system. Thus, whereas a conventional rewards system recognizes payment cards using the card BIN range (the first 6 digits of the PAN), in embodiments of the present disclosure the rewards management system is arranged to use tokenization data in a different format, such as a token BIN range (the first 8 digits of the PAN).

Furthermore, the disclosure may be expressed as a method performed by a server of the issuer for processing an electronic transaction between a cardholder and a merchant carried out over a payment network. The method comprises: transmitting, by a server of the issuer, an electronic request for a token representing payment data of the payment card of the cardholder to a tokenization server; the server of the issuer receiving identification data associated with the token obtained by the tokenization server; the tokenization server storing a mapping between payment credentials of the payment card and the token; and the issuer's server transmitting tokenization data to a rewards management system, said tokenization data comprising the identification data and issuer data indicative of rewards information associated with the payment card, thereby enabling the rewards management system to determine rewards information associated with the token using the tokenization data.

The disclosure may also be expressed as an issuer's server for processing an electronic transaction. The merchant terminal comprises a computer processor and a data storage device, and the data storage device stores non-transitory instructions operative by the processor to cause the processor to perform the method as described above.

Furthermore, the disclosure may be expressed as a method performed by a server of an issuer bank of the payment card for processing an electronic transaction between a cardholder and a merchant carried out over a payment network. The issuer's server is configured to be in communication with a reward management system and a tokenization server. The issuer's server having a computer processor and a data storage device, the data storage device storing non-transitory instructions operative by the processor to cause the processor to: transmit an electronic request for a token representing payment data of the payment card to the tokenization server; receive identification data associated with the token obtained by the tokenization server, the tokenization server storing a mapping between payment credentials of the payment card and the token; and transmit tokenization data to the rewards management system; said tokenization data comprising the identification data and issuer data indicative of rewards information associated with the payment card, thereby enabling the rewards management system to determine rewards information associated with the token using the tokenization data.

The term "payment card" referred to in this document may include, but is not limited to, a physical (e.g. plastic) card. Rather, the term refers to a bank account such as a credit card, a debit card, loan, checking, and/or savings account, having a primary account number (PAN) maintained by an issuer bank ("the issuer"). The PAN functions as payment credentials used when making a payment. Conventionally, the PAN is a 16-digit PAN number, which, if a physical card exists, is printed on the card. However, a payment card can be used in the present disclosure irrespective of whether a physical card bearing the payment credentials exists. Non exhaustive examples of payment cards include a credit card, a debit card, a prepaid card, a charge card, a membership card, a promotional card, a frequent flyer card, an identification card, a prepaid card, a gift card, etc. A payment card may also be embodied in another device that may hold payment card information (including bank account information associated with the card), such as mobile phones, smartphones, personal digital assistants (PDAs), key fobs, transponder devices, NFC-enabled devices, and/or computers.

The term "payment credentials" refers to an identifier associated with a payment card which allows the payment card to be uniquely identified within a context. In most cases, the payment credentials are the card number printed on the card (also known as the PAN), e.g., the 16-digit card number of a MasterCard® payment card.

The term "token" means a piece of data, typically used in place of real or sensitive information as a surrogate value. A token may be represented by a series of digits, alphabets, alphanumerical characters or any other characters or symbols, such as punctuation marks.

Further areas of applicability will become apparent from the description provided herein. The description and specific examples and embodiments in this summary are intended for purposes of illustration only and are not intended to limit the scope of the present disclosure. In addition, the above and other features will be better understood with reference to the followings Figures which are provided to assist in an understanding of the present teaching.

DRAWINGS

The drawings described herein are for illustrative purposes only of selected embodiments and not all possible implementations, and are not intended to limit the scope of the present disclosure.

Embodiments of the present disclosure will now be described for the sake of non-limiting examples only, with reference to the following drawings in which.

Corresponding reference numerals generally indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Figure 1:
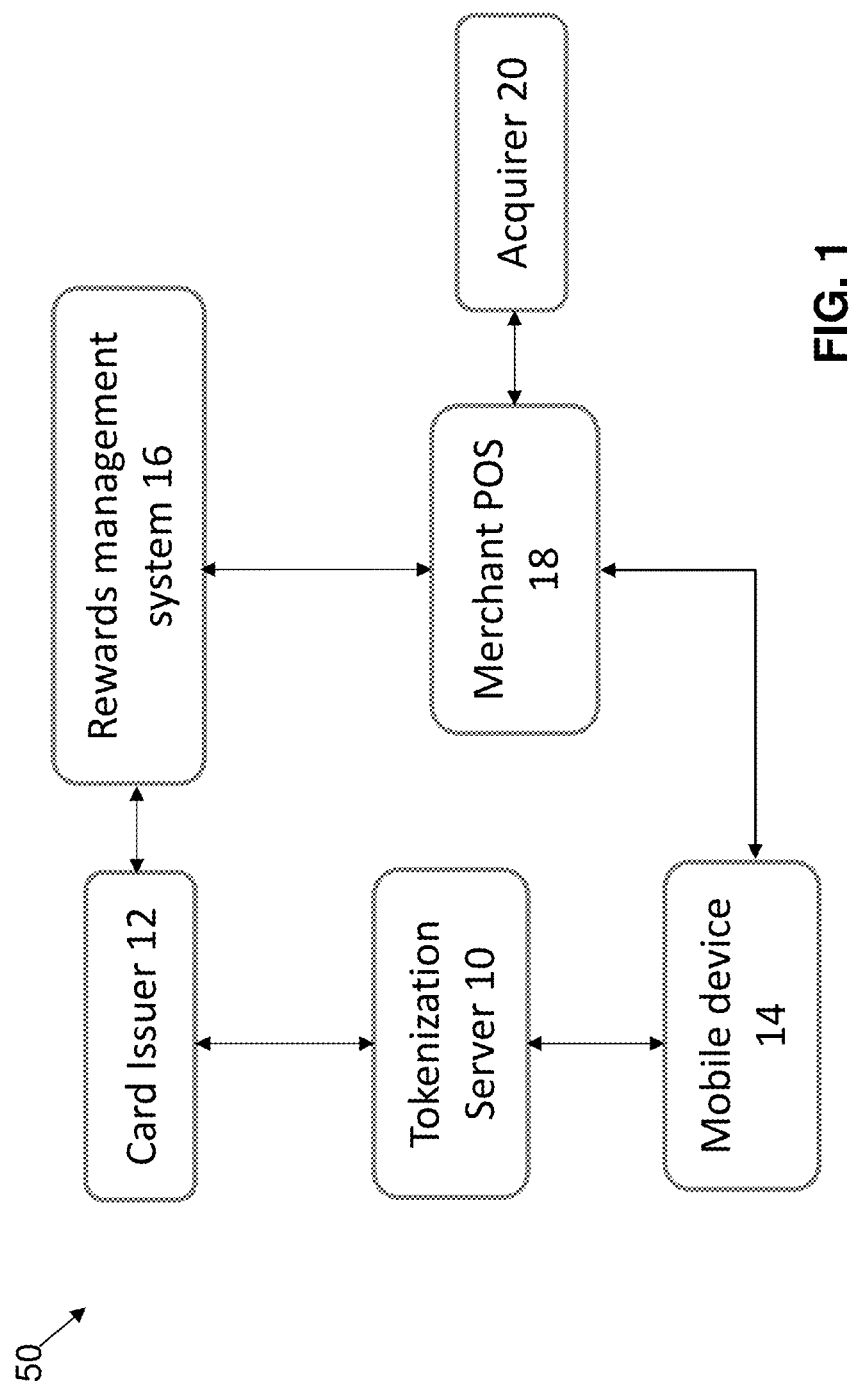
FIG. 1 illustrates a system which is an embodiment of the disclosure.

FIG. 1 shows a system 50 which is an embodiment of the present disclosure. The system 50 performs a process which is described below with reference to FIGS. 2 and 3.

As shown in FIG. 1, the system 50 has a tokenization server 10 which is provided to interface a server of an issuer 12 (also known as the issuing bank or card issuing bank) and a cardholder's device 14 for handling requests and/or communications between them for a transaction carried out over a payment network. A rewards management system 16 is provided for administering and managing rewards information associated with the payment card from the issuer's server 12. The rewards management system 16 communicates with the issuer's server 12 and a merchant terminal 18, such as the merchant's point-of-sale terminal, to provide rewards information to the merchant terminal 18. The merchant terminal 18 communicates with the cardholder's device 14 and an acquirer 20 (also known as the acquiring bank or the merchant acquiring bank) to receive payment information and preparing a transaction request accordingly for the acquirer 20 to process the transaction.

The various parties or terminals of the systems 50 may communicate via any types of network, for example, virtual private network (VPN), the Internet, a local area and/or wide area network (LAN and/or WAN), or even a contactless interface (e.g. via a contactless QR code reader).

Figure 2:
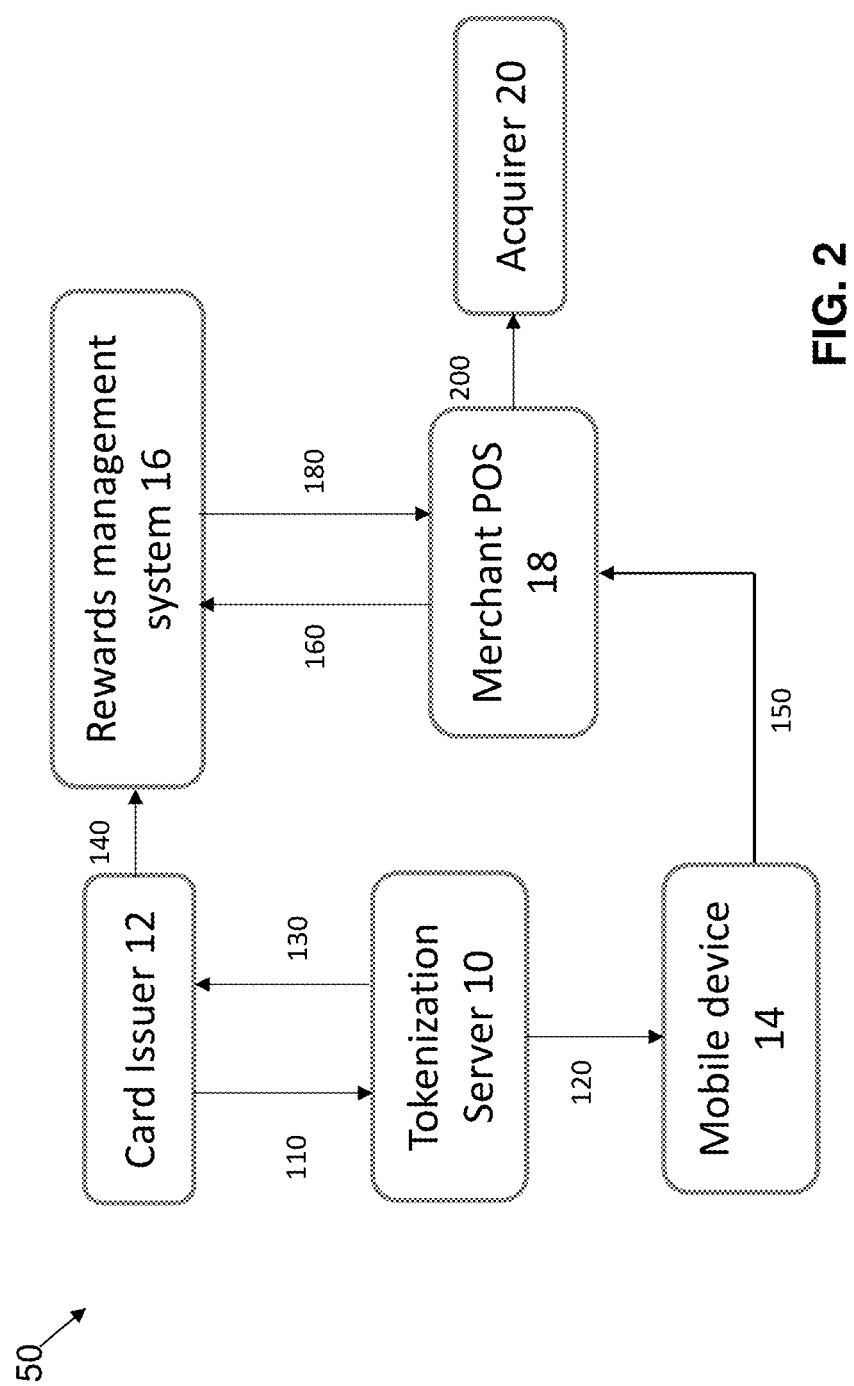
FIG. 2 illustrates process steps which are performed by the system of FIG. 1 during a transaction process.

The block diagram of FIG. 2 illustrates a flow of an exemplary method carried out by various parties or systems using a payment network. The payment network can be any electronic payment network which connects, directly and/or indirectly payers (consumers and/or their banks or similar financial institutions) with payees (the merchants and/or their banks or similar financial institutions). Non-limiting examples of the payment network are a payment card type of network, such as the payment processing network operated by MasterCard®, Inc.

In this example, the tokenization server 10 is a cloud server comprising multiple connected servers. Alternatively, as will be understood by a skilled person, the tokenization server 10 could be a dedicated physical server. The tokenization server 10 comprises one or more processing centers, which are usually implemented as one or more computer processors. The computer processors are configured to implement the tokenization of real payment credentials, such as the PAN, thereby generating a token associated with the card data. The tokenization server 10 is in communication with a database which stores the mapping between the real payment credentials and the token. In one embodiment, the database is stored by the tokenization server 10 and is accessible by the processing center. The database may contain payment credentials for one or more payment cards associated with cardholders. The database may store the payment credentials for payment cards issued by a same payment card association, such as an issuing bank. In another embodiment, the database stores payment credentials for payment cards issued by multiple card issuing banks In some embodiments, the token is requested and updated over a time-interval (i.e. a new token is generated after a certain period of time, or once an electronic transaction has been performed with the token). In other embodiments, the token is generated some time in the past such as in respect of a past transaction carried out earlier. In one example, the token is be generated once for the payment card and is stored by the cardholder's device, the issuer's server and the rewards management system for any future transactions.

The tokenization server 10 further has a data storage device (not shown) storing instructions operative by the one or more processors to cause the processor to perform relevant operations of a method 100 described below with reference to FIG. 3. The data storage device may be any physical persistent storage device such as, but not limited to, a hard-drive.

Similarly, the server of the issuer 12 may be implemented as a cloud server or a dedicated physical server. The server of the issuer 12 similarly comprises one or more processing centers typically implemented as one or more computer processors, and a data storage device storing instructions operative by the one or more processors to cause the process to perform relevant operations of the method 100.

Figure 3:
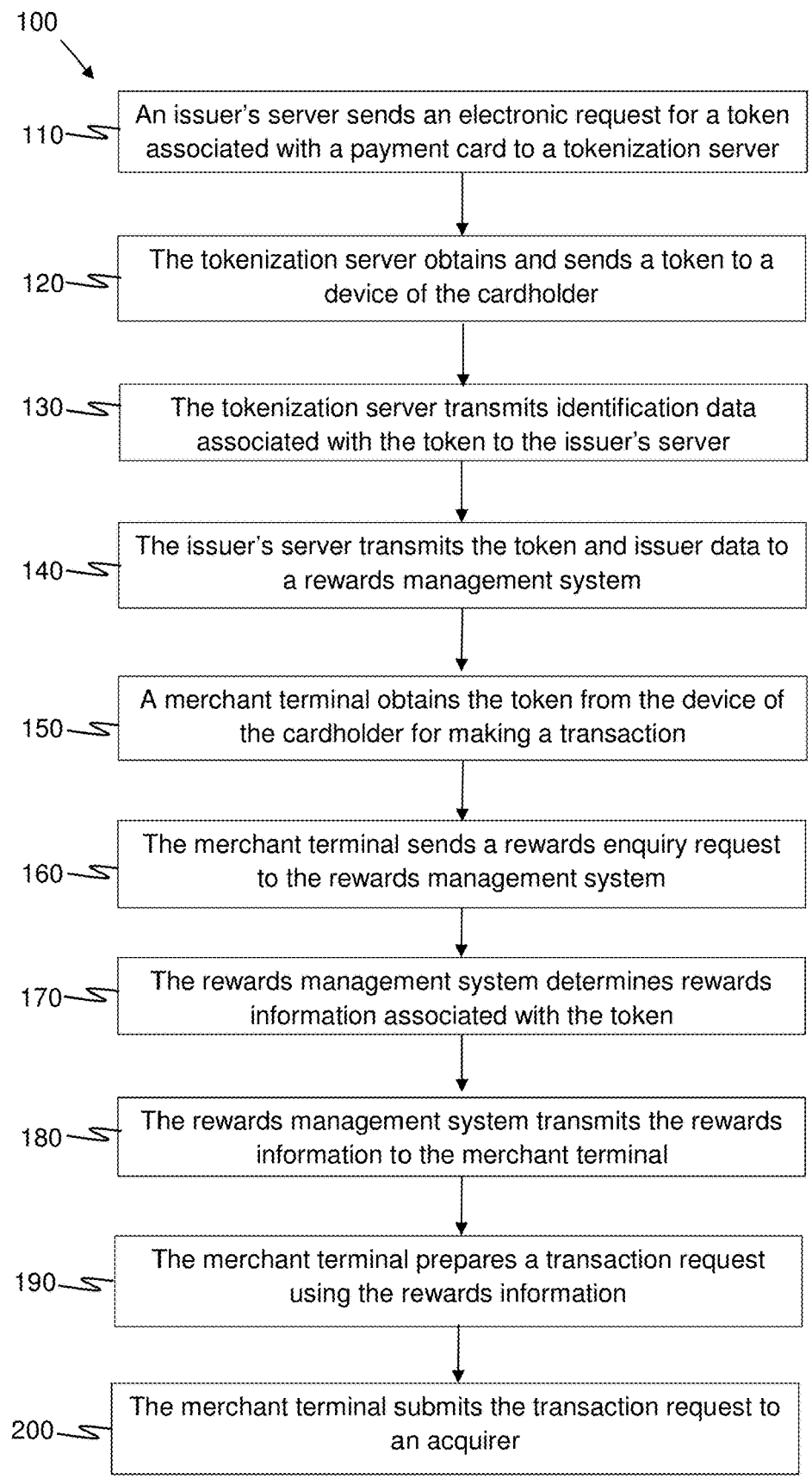
FIG. 3 is a flow diagram of steps in the transaction process of the embodiment of FIG. 2.

Referring to FIG. 3, at step 110, the issuer's server 12 sends an electronic request to the tokenization server 10, requesting a token representing payment data of the payment card of the cardholder. The electronic request comprises real payment credentials (or encryption thereof) such as the PAN of the payment card for which a token is requested. If the tokenization server 10 is designed according to presently conventional techniques, it does not need to have the full 16 digit PAN number to generate the 16 digit token number; the tokenization server 10 only needs the first 6 digits (BIN) range from the issuer. Nevertheless, the tokenization server 10 generates a 16 digit token.

At step 120, the tokenization server 10 obtains a token based on the electronic request and transmits the token to the device 14 of the cardholder of the payment card. The token can be obtained by the processing center of the tokenization server 10 by performing a step of tokenization, which will be understood by a skilled person, and a non-limiting exemplary method of which is disclosed in U.S. patent application Ser. No. 14/514,290. The token may be used for making an electronic transaction or payment by the cardholder. The cardholder may initiate a request for the token to be downloaded to the cardholder's device 14. At this stage, the device 14 transmits the entire 16 digit card number to the tokenization server 10; although this is not required to form the token, it is preferably retained in a database of the tokenization server 10, for detokenization (i.e. mapping back to the real PAN) later in the transaction, as part of the process of arranging a payment to the merchant (step 200; see below). Alternatively, the token may be pushed to the device 14 for it to be downloaded automatically by the device without requiring initiation from the cardholder's device 14 or the cardholder. The cardholder's device 14 is any electronic device that can be used by the cardholder to communicate with the tokenization server 10 and the merchant terminal 18 (as will be explained later). In this example, the cardholder's device 14 is a smart phone. It will be understood by a skilled person that other electronic devices such as media players and smart watches could also be used. In some embodiments, the identity of the cardholder's device/cardholder is verified for security purposes before the token is sent to the device 14. As will be understood by a skilled person, this may be achieved by requesting certain identity data, such as a PIN, biometric identity to authenticate the cardholder's device, etc.

The tokenization server 10 further transmits identification data associated with the token to the issuer's server 12 at step 130. The identification data associated with the token may comprise the token itself or a part of it, such as a truncated string of the token. The identification data is extracted from the token such that it defines a unique association between the token and a card issuer. In this example, the identification data is the first 8 digits of the token (the "token BIN range"). Note that the token BIN range is sufficient to identify the issuer and its products. The entire token, like the entire PAN, is difficult to manage both from a resource as well as security perspective. Note that the enumeration of steps is for the clarity of illustration and clarity and that the elements or steps need not be performed in the order implied by the enumeration. Clearly, it is possible for the tokenization server 10 to transmit the identification data associated with the token to the issuer server 12 before or at the same time as the token is transmitted to the cardholder's device 14.

At step 140, the issuer's server 12 transmits tokenization data to a rewards management system 16. The tokenization data comprises the identification data associated with the token (i.e. the token PAN or the data extracted from it) and further comprises issuer data. The issuer data comprises data indicative of rewards information associated with the payment card. The issuer data may be the issuer's identity, such as the name of the bank, identification number of the bank, or other information which allows the issuer to be uniquely identified within a context. Such information allows the rewards information associated with the payment card to be identified by the rewards management system 16 by using existing knowledge on the rewards information available for respective issuers. For example, the rewards management system 16 is made accessible to a rewards database storing rewards information corresponding to respective issuer data (e.g. the identity of the issuer). The issuer data may further comprise a sub-category of the payment cards issued by the issuer. For example, the different sub-categories of cards issued by the same issuer may be offered with different rewards scheme. In this case, each sub-category of the payment cards are associated with the respective rewards information which is applicable to that particular sub-category. The tokenization data may be encrypted before transmission. The rewards management system 16 processes the tokenization data received and stores the association between the identification data associated with the token and the issuer data (such as issuer's identity) so as to provide rewards information for transactions carried out at the merchant terminal 18, as will be described later. Alternatively, rewards information associated with the identification data associated with the token may be provided directly by the server of the issuer 12 as a part of the tokenization data to the rewards management system 16. In that case, the identity of the issuers need not be provided to the rewards management system 16 for retrieving rewards information therefrom.

When the cardholder attempts to make an electronic transaction with a merchant via the merchant terminal using the payment card, the cardholder's device 14 is presented, which carries the token which represents payment data of the payment card, to the merchant's point-of-sales terminal 18. At step 150, the merchant terminal 18 reads and extracts the token information for making the transaction, for example, via a contactless QR code reader and or Near-Field-Communication (NFC) technology.

At step 160, the merchant terminal 18 transmits a rewards inquiry request to the rewards management system 16 to retrieve rewards information associated with the payment card used for the transaction. The rewards inquiry request comprises the token received from the cardholder's device 14. The rewards inquiry request may further contain other transaction details such as the transaction time, transaction value and the merchant terminal identifier, which allows the rewards management system 16 to determine rewards information applicable to the transaction. For example, issuers may provide tiered rewards schemes based on a value of a transaction. Accordingly, this allows the most appropriate rewards information to be retrieved from the rewards management system 16 in view of the further transaction details.

In response to the rewards inquiry request, the rewards management system 16 determines rewards information associated with the token received as a part of the rewards inquiry request at step 170. As described earlier, the rewards management system 16 provides a rewards database defining a correspondence between identification data of the token and rewards information, associated with the same payment card, for one or more payment cards. Accordingly, for a given token, the rewards management system 16 is able to determine the associated rewards information using the rewards database. At step 180, the rewards information is transmitted to the merchant terminal 18, which prepares a transaction request using the rewards information at step 190. For example, the merchant terminal 18 applies a discount to the original transaction value in accordance with the rewards information provided by the rewards management system 16, before the merchant terminal submits the transaction request to the acquirer 20 of the merchant at step 200 for its subsequent processing.

The explanation above is in terms of what is performed for a single card. However, in practice, a given issuer 12 will issue a large number of payment cards, each having a PAN number beginning with a 6-digit number according to one of the fixed BIN ranges. In a conventional system, as explained above, one or more rewards are associated with a given BIN range, and in the embodiment, correspondingly, the one or more rewards will be associated with a respective token BIN range (8 digits). Instead of performing step 140 for each card, the issuer 12 will send the tokenization data to the rewards management server 16 once per tokenized BIN range. Thus, all the tokenized BIN's (8 digits) are sent to the rewards management server 16 once when a given BIN range is tokenized.

Figure 4:
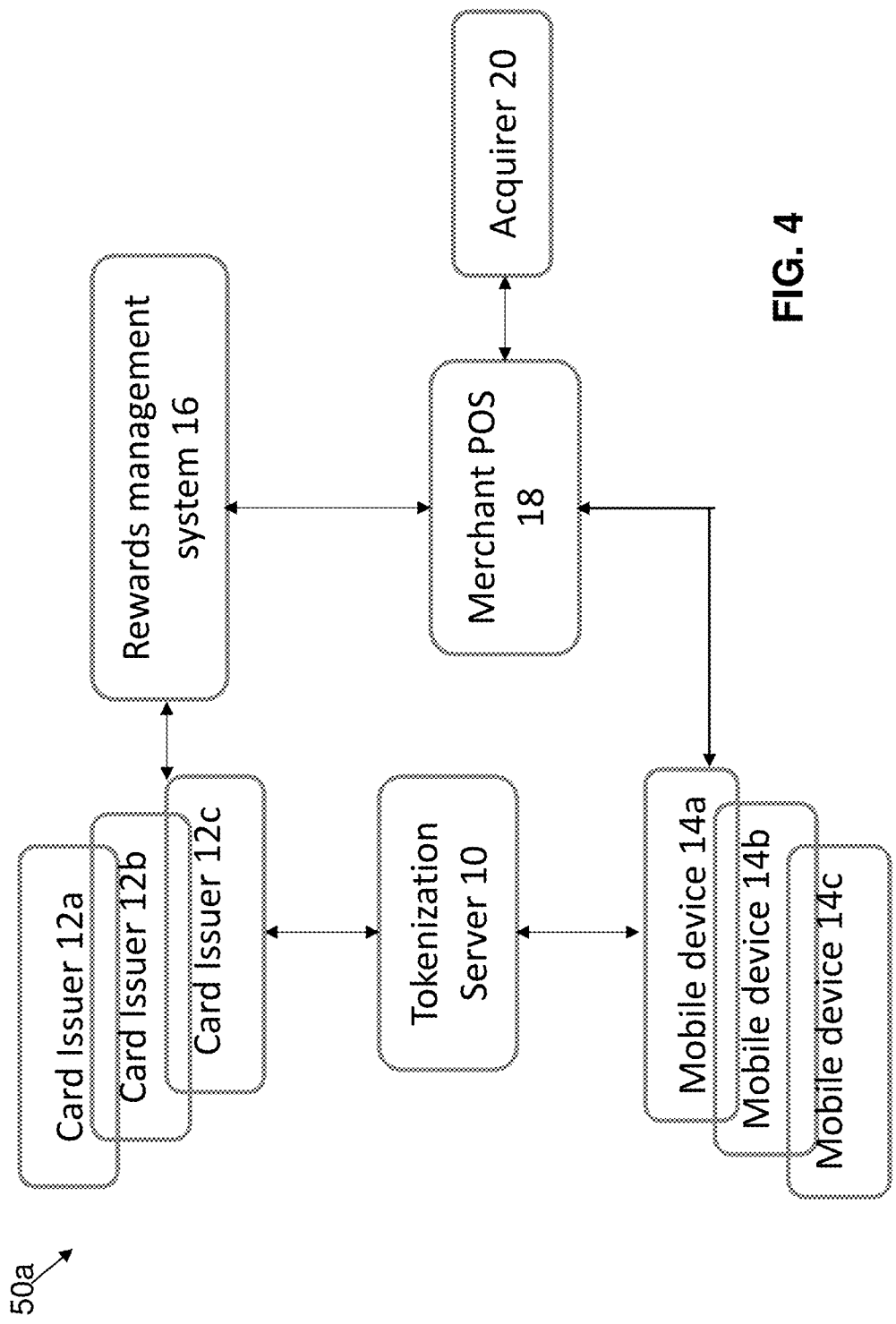
FIG. 4 illustrates a system which is another embodiment of the disclosure in which transactions involve cards from different card issuing banks, and/or different cardholders' devices.

In another embodiment, as shown in FIG. 4, the system 50a is provided for processing transactions involving a plurality of payment cards from different issuers 12a, 12b, 12c and/or different cardholders' devices 14a, 14b, 14c. The rewards management system 16 may function as a platform which is configured to communicate with servers of the plurality of issuers 12a, 12b 12c and the cardholders' devices 14a, 14b, 14c. For example, the rewards management system 16 may be organized by one or more service providers which administer and distribute rewards information (such as promotional discounts) associated with the payment cards issued by the issuers 12a, 12b, 12c.

It will be understood by a skilled person that when the method involves a plurality of issuers and/or plurality of cardholders and the associated devices, the flow of the method remains similar to what is described above. In that case, the rewards management system 16 may function as a centralized platform for managing rewards information for payment cards issued by different issuers and/or providing the information to a plurality of merchants.

When there are a plurality of issuers 12a, 12b, 12c, each of the respective servers can be implemented in the same way to the embodiment described above to interface the rewards platform 16 and the tokenization server 10. Alternatively, the respective issuer servers 12a, 12b, 12c may interface a respective tokenization server (not separately shown), which are functionally isolated from one another. This enhances the security and integrity of each tokenization server. In a further alternative, a single tokenization server can be provided (e.g. by an organization which is commercially separate from all the issuers 12a, 12b, 12c) which allows the multiple issuers 12a, 12b, 12c to generate tokens to be used by respective rewards servers. Similarly, in other embodiments, the plurality of issuers may share the same issuer server. In yet further embodiments, each of the issuers employs a separate and isolated issuer server as well as a tokenization server.

The functions and/or steps and/or operations included herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Further, it should be appreciated that one or more aspects of the present disclosure transform a general-purpose computing device into a special-purpose computing device when configured to perform the functions, methods, and/or processes described herein.

Whilst the foregoing description has described exemplary embodiments, it will be understood by those skilled in the art that many variations of the embodiment can be made within the scope and spirit of the present disclosure. For example, it is not required for the servers (e.g. the tokenization server or the server of the rewards management system) to physically store the respective database. Instead, the database can be stored somewhere else but made accessible to the respective processing centers of the servers. In another variant, it is not necessary for the server of the issuer to transmit the identification data associated with the token to the rewards management system. Instead, this can be done by the tokenization server, too. In this case, the identification data may be accompanied by additional information which allows the respective issuer data to be identified or to be paired up at the rewards management system. For another example, the system described above can be used for both point-of-sales transactions and internet-based (e-commerce) transactions in which the role of the merchant terminal is played by at least one server. In the latter case, the merchant terminal receives the token from the cardholder's device via, for example, a mobile network or the internet.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for processing an electronic transaction between a cardholder and a merchant using a payment account, wherein the electronic transaction is carried out over a payment network, the method comprising:

receiving, by a rewards management system, from an issuer of the payment account, tokenization data associated with the payment account, said tokenization data comprising identification data for a token associated with the payment account and issuer data comprising an identity of the issuer of the payment account associated with the token, wherein the issuer of the payment account provides a rewards scheme comprising rewards associated with the payment account and applicable to transactions using the payment account, wherein the token is specific to payment data for making a transaction to the payment account and is different than a primary account number (PAN) for the payment account, and wherein the identification data for the token includes a segment of the token;

receiving, by the rewards management system, a rewards inquiry request from a merchant terminal associated with a merchant in response to the electronic transaction between the cardholder and the merchant, wherein the electronic transaction is based on the token, said rewards inquiry request comprising the token;

determining, by the rewards management system, in response to the rewards inquiry request, at least one of the rewards of the rewards scheme for application to the electronic transaction between the cardholder and the merchant based on the token received from the merchant terminal, the identification data for the token received from the issuer, and the issuer data received from the issuer; and transmitting, by the rewards management system, the determined at least one of the rewards to the merchant terminal, thereby permitting the merchant to submit a transaction request for the electronic transaction to an acquirer, taking into account the determined at least one of the rewards.

2. The method according to claim 1, wherein receiving, by the rewards management system, the tokenization data includes receiving the tokenization data from a server of the issuer of the payment account.

3. The method according to or claim 2, wherein the token is generated, upon a request from the issuer, by a tokenization server storing a mapping between payment credentials of the payment account.

4. The method according to claim 1, wherein the rewards information is mapped to the issuer data in a rewards database.

5. The method according to claim 1, wherein the segment of the token includes a token bank identification number (BIN) having eight digits.

6. The method according to claim 5, wherein the issuer data further comprises a sub-category of the payment account issued by the issuer; the sub-category being associated with the determined at least one of the rewards.

7. The method according claim 1, wherein the rewards inquiry request further comprises transaction data for the electronic transaction including at least one of: (a) a transaction value, (b) a transaction time, and/or (c) a merchant terminal identifier; and wherein the determined at least one of the rewards is further based on the transaction data.

8. The method according to claim 1, further comprising storing the rewards information for the payment account in association with the token.

9. A rewards management system for processing an electronic transaction between a cardholder and a merchant using a payment account, wherein the electronic transaction is carried out over a payment network, the rewards management system comprising:

a server configured to be in communication with a merchant terminal of the merchant;

a computer processor and a data storage device, the data storage device storing non-transitory instructions operative by the processor to cause the processor to:

receive tokenization data associated with the payment account from the server, said tokenization data comprising identification data associated with a token associated with the payment account and issuer data including an identity of an issuer of the payment account associated with the token, wherein the issuer of the payment account provides a rewards scheme that includes rewards associated with the payment account and applicable to transactions using the payment account, wherein the token is specific to payment data for making a transaction to the payment account and is different than a primary account number (PAN) for the payment account, and wherein the identification data for the token includes a segment of the token;

receive a rewards inquiry request from the merchant terminal in response to the electronic transaction between the cardholder and the merchant, wherein the electronic transaction is based on the token, said rewards inquiry request comprising the token associated with the payment account;

determine, in response to the rewards inquiry request, at least one of the rewards of the rewards scheme for application to the electronic transaction between the cardholder and the merchant based on the token received from the merchant terminal, the identification data, and the issuer data; and transmit the determined at least one of the rewards to the merchant terminal, thereby permitting the merchant associated with the merchant terminal to submit a transaction request for the electronic transaction to an acquirer, taking into account the determined at least one of the rewards.

10. The rewards management system according to claim 9, wherein the server is configured to be in communication with a server of the issuer of the payment account to receive the tokenization data from the issuer's server.

11. The rewards management system according to claim 9, wherein the data storage device further stores non-transitory instructions operative by the processor to cause the processor to receive the tokenization data from a server of the issuer of the payment account.

12. The rewards management system according to claim 9, wherein the issuer data further comprises a sub-category of the payment account issued by the issuer; the sub-category being associated with the determined at least one of the rewards.

13. The rewards management system according to claim 9, wherein the rewards inquiry request further comprises transaction data for the electronic transaction including at least one of: (a) a transaction value, (b) a transaction time, and/or (c) a merchant terminal identifier; and wherein the data storage device further stores non-transitory instructions operative by the processor to cause the processor to determine the at least one of the rewards identified by the rewards information based further on the transaction data.

* * * * *